(12) United States Patent
Cook et al.

(10) Patent No.: US 9,475,655 B2
(45) Date of Patent: Oct. 25, 2016

(54) ARTICLE CARRIER APPARATUS AND METHOD

(71) Applicant: Compac Technologies Limited, Auckland (NZ)

(72) Inventors: Lee Adrian Cook, Auckland (NZ); Jonathan Patrick Jackson, Auckland (NZ)

(73) Assignee: Compac Technologies Limited, Auckland (NZ)

( * ) Notice: Subject to any disclaimer, the term of this patent is extended or adjusted under 35 U.S.C. 154(b) by 0 days.

(21) Appl. No.: 14/575,960

(22) Filed: Dec. 18, 2014

(65) Prior Publication Data

US 2015/0101908 A1 Apr. 16, 2015

Related U.S. Application Data

(63) Continuation of application No. PCT/NZ2013/000129, filed on Jul. 19, 2013.

(51) Int. Cl.
| | |
|---|---|
| *B65G 43/00* | (2006.01) |
| *B65G 47/71* | (2006.01) |
| *B07B 13/16* | (2006.01) |
| *B65G 47/76* | (2006.01) |
| *B07C 5/36* | (2006.01) |
| *B65G 47/51* | (2006.01) |

(52) U.S. Cl.
CPC ............... *B65G 47/71* (2013.01); *B07B 13/16* (2013.01); *B07C 5/36* (2013.01); *B65G 43/00* (2013.01); *B65G 47/766* (2013.01); *B65G 47/5104* (2013.01); *B65G 2201/0211* (2013.01)

(58) Field of Classification Search
CPC .. B65G 47/50; B65G 47/46; B65G 47/5109; B65G 47/5113; B65G 47/5118; B65G 47/82

USPC ........................................ 198/374.4, 370.07
See application file for complete search history.

(56) References Cited

U.S. PATENT DOCUMENTS

| | | | | | |
|---|---|---|---|---|---|
| 2,942,718 | A | * | 6/1960 | Buhrer | B22D 30/00 198/370.07 |
| 3,122,231 | A | * | 2/1964 | Pence | B07C 1/02 198/347.4 |
| 3,153,487 | A | * | 10/1964 | Hoellen | B65G 1/1371 186/55 |
| 3,173,557 | A | * | 3/1965 | Eliassen | B65G 43/08 198/347.4 |
| 5,308,001 | A | * | 5/1994 | Grecksch | D01H 9/187 198/347.4 |
| 5,411,131 | A | * | 5/1995 | Haegele | B65G 43/08 198/347.4 |
| 2003/0077152 | A1 | * | 4/2003 | Sanchez Gomez | B65G 47/5104 414/266 |
| 2011/0180368 | A1 | * | 7/2011 | Rockstead | B65G 47/766 198/367 |

* cited by examiner

*Primary Examiner* — James R Bidwell
(74) *Attorney, Agent, or Firm* — Lowe Graham Jones PLLC (57) ABSTRACT

The present subject matter relates to article carriers and related methods for use in grading apparatus and in particular, but not exclusively, for use in grading fruit. The present subject matter provides an article carrying apparatus comprising a plurality of carrier lanes each for receiving and conveying a number of articles; one or more diverters arranged to control the distribution of received articles into the lanes; a sensor arranged to determine a capacity use parameter for each lane; and a controller arranged to control the position of each diverter dependent on the determined capacity use parameters.

27 Claims, 6 Drawing Sheets

ARTICLE CARRIER APPARATUS AND METHOD

PRIORITY CLAIM

This application is a continuation of PCT Application Serial No. PCT/NZ2013/000129 filed Jul. 19, 2013.

FIELD OF THE INVENTION

The present subject matter relates to article carriers for use in grading apparatus and in particular, but not exclusively, for use in grading fruit.

BACKGROUND OF THE INVENTION

Processing lines for articles such as fruit often require different quality articles to be separated. This is an important commercial function, which may be used for example, to distinguish between fruit destined for export and fruit destined for the local market. Manually grading articles is costly, slow and prone to inaccuracies. Thus, automated methods and apparatus for grading articles have been developed. Known sorters can grade and sort produce by weight, color, blemish, dimensions, shape, density, internal taste/quality etc.

The use of one or more video cameras is one known method of automatically sensing characteristics of articles. For example, the method and apparatus described in U.S. Pat. No. 4,825,068, the disclosure of which is incorporated herein by reference, uses a video camera in conjunction with mirrors to obtain a picture of each article as it travels past the line of sight of the mirrors. The mirrors enable a larger portion of the article, which is typically generally spherically shaped, to be simultaneously viewed by the camera.

Article carriers are used to transport articles such as fruit through various measurement stages for grading purposes and to eject fruit at a required location dependent on the result of the grading process. Such article carriers usually include an endless circuit of carriers or cups on a conveyor chain with the cup situated to unload fruit at one of a plurality of stations. There is also often a requirement to carry large numbers of incoming fruit using a plurality of parallel carriers. Typically such article carrier apparatus having multiple conveyor chains or belts are arranged to receive individual fruit articles into respective cups, the fruit being delivered on an adjacent infeed shelf.

The infeed shelf receives fruit and is typically inclined downwardly towards the plurality of article carriers, and may narrow in order to concentrate received fruit towards the article carriers. Some infeed shelves incorporate diverters which are typically blunt protrusions extending perpendicularly from the infeed shelve and angled to guide the fruit articles towards the incoming cups of the article conveyor chain. The diverters may also be used to balance the numbers of fruit directed to each article carrier to ensure high capacity carriage on each of the article carriers, for example, by ensuring that sufficient numbers of fruit articles are delivered to the article carriers at the outer ends of the parallel article carriers. The diverters are typically fixed and may be integral with the infeed shelf, however manual alignment or angling of the diverters may be provided in some infeed shelves.

Throughout this specification, any reference to items of prior art is in no way to be deemed as an admission that such prior art constitutes part of the common general knowledge.

SUMMARY OF THE INVENTION

It is an object of the present subject matter to provide an improved article carrier apparatus, or at least to provide the public with the useful alternative.

In one aspect there is provided an article carrying apparatus comprising a plurality of carrier lanes each for receiving and conveying a number of articles and one or more diverters arranged to control the distribution of received articles into the lanes. A sensor is arranged to determine a capacity use parameter for each lane, and a controller is arranged to control the position of each diverter dependent on the determined capacity use parameters.

By automatically controlling the diverters based on the capacity use parameters of the lanes, the articles can be distributed more evenly across the lanes resulting in greater overall throughput of articles. In an embodiment the articles are fruit and the capacity use parameter is the cupfill of a lane.

In an embodiment the diverters are individually rotatable, and are positioned at a receiving end of the lane and between respective adjacent lanes.

In an embodiment the controller may be arranged to adjust the positions of diverters adjacent a lane dependent on a difference in the capacity use parameter of that lane and the capacity use parameters of adjacent lanes.

In an embodiment the controller may be arranged to adjust the positions of diverters adjacent a lane dependent on differences between the capacity use parameter of that lane and an average capacity use parameter derived from the capacity use parameters for each of a plurality of groups of adjacent lanes, where each group of adjacent lanes comprises a different number of adjacent lanes.

In an embodiment the controller may be arranged to adjust the positions of diverters adjacent a lane dependent on a lane adjustment parameter. The lane adjustment may comprise the sum of a plurality of group differences between the capacity use parameter of that lane and the average capacity use parameters of each group of adjacent lanes, divided by the harmonic number of the total number of groups of adjacent lanes.

In an embodiment the controller is arranged to adjust the positions of the diverters dependent on differences between the capacity use parameters of adjacent lanes.

In an embodiment the controller is arranged to adjust the positions of the diverters using a plurality of differences between the capacity use parameter of each lane and an average capacity use parameter derived from the capacity use parameters for a plurality of groups of adjacent lanes, each group of adjacent lanes comprising a different number of adjacent lanes.

In an embodiment the controller is arranged to adjust the position of each diverter using the lane adjustment parameter of adjacent lanes, and to adjust the position of each diverter dependent on a final adjustment parameter derived from averaging the lane adjustment parameters of adjacent lanes when in the same direction or which is derived from the larger of the lane adjustment parameters when in opposite directions.

In an embodiment each carrier lane comprises a plurality of cups each for receiving an item, and the capacity use parameter is the cupfill of the respective carrier lane.

In an embodiment the sensor comprises a camera arranged to view carried articles on each respective carrier lane.

In an embodiment the article carrying apparatus further comprises an infeed tray located adjacent or arranged to incorporate the diverters.

In another aspect there is provided a controller for an item carrying apparatus having a plurality of carrier lanes each for receiving and conveying a number of items, one or more diverters arranged to control the distribution of received items into the lanes, and a sensor arranged to determine a capacity use parameter for each lane; the controller arranged to control the position of each diverter dependent on the determined capacity use parameters.

In another aspect there is provided a method of operating an item carrying apparatus comprising a plurality of carrier lanes each for receiving and carrying a number of items, one or more diverters arranged to control the distribution of received items into the lanes, and a sensor arranged to determine a capacity use parameter for each lane. The method comprises controlling the position of each diverter automatically dependent on the determined capacity use parameters.

In embodiments, controllers and methods corresponding to the above apparatus are also provided.

In another aspect there is provided a computer program product which when implemented on a computer causes the computer to execute the above defined methods.

The invention may also be said broadly to consist in the parts, elements and features referred to or integrated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

Embodiments of the invention will now be described with reference to the accompanying drawings, by way of example only and without intending to be limiting, in which.

DETAILED DESCRIPTION

Figure 1:
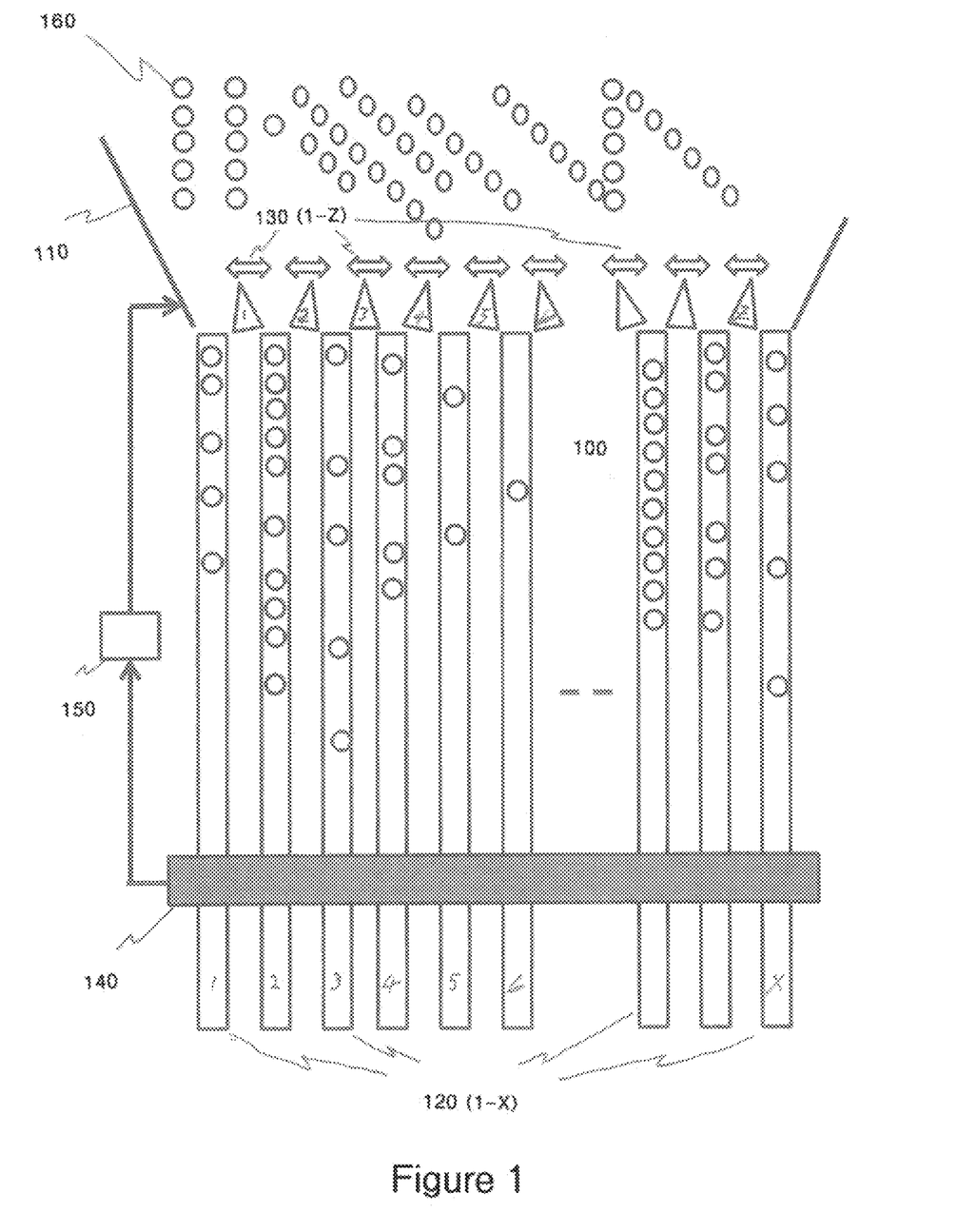
FIG. 1 shows a plan view of an article carrier apparatus according to an embodiment.

An article carrier apparatus according to an embodiment is shown in plan view in FIG. 1. The article carrier apparatus 100 comprises a plurality of carrier lanes 120 (1-$x$) for receiving and carrying a number of articles 160. The carrier lanes may each comprise an endless chain loop of cups each for receiving and carrying a respective article such as an item of fruit. Alternatively, the carrier lanes may comprise an endless belt loop sufficiently narrow to receive one fruit at a time. The carrier lanes 120 are arranged in parallel although alternative embodiments may provide for different relative arrangements of the carrier lanes. The carrier lanes receive fruit such as cherries or other food articles 160 from one or more infeed tray 110. The infeed tray 110 is typically sloping down towards the carrier lanes 120 and may narrow in order to direct the articles 160 towards the carrier lane cups or continuous belt. The infeed tray 110 receives fruit or other articles 160 from a coupled apparatus such as a fruit washer. The plurality of carrier lanes 120 carry the articles 160 either to another article processing apparatus, or to other carrier lanes or shutes according to a sorting assessment of the respective articles based for example on size, color, number of blemishes etc.

Those skilled in the art will appreciate that the cups of the carrier lanes are individually controllable to divert their respective food article into an appropriate sorting lane or shute. The sorting is typically carried out using an automatic sorter 140 which might use video cameras to monitor passing articles in order to determine size, shape, color, blemishes, and other parameters which can then be used to sort the respective fruit article. A known automatic sorter is described in international PCT patent application WO 2010/008303, the content of which is hereby incorporated by reference. The output from the automatic sorter or sensor 140 can then be used to control the respective carrier lanes in order to deliver fruit to appropriate downstream sorting channels.

In order to maximize throughput of fruit articles 160, it has been recognized that the fruit arriving on the infeed tray 110 should be distributed as evenly as possible across the carrier lanes 120 in order to maximize the capacity usage of each carrier lane 120. In other words it is desired for example to avoid fruit bunching near the middle carrier lanes whilst very little fruit is delivered to the outer lanes resulting in high capacity usage at the middle lanes but low capacity usage at the outer lane. In order to achieve a more even distribution of fruit to the carrier lanes, the article carrier apparatus comprises a number of diverters 130 (1-$z$) arranged to control the distribution of fruit to the carrier lanes 120. The diverters 130 shown in the embodiment are located adjacent and between respective carrier lanes 120. In alternative embodiments, different diverter locations and numbers may be employed, for example between every second carrier lane or spaced further up the infeed tray 110. The diverters 130 (1-$z$) are individually controllable to rotate so that an input channel for a particular carrier lane 120 can be enlarged or restricted by adjusting the adjacent diverters in order to increase or reduce the flow of fruit to said carrier lane. By controlling all of the diverters 130 in the article carrier apparatus, the distribution of articles across the carrier lanes can be made more uniform, thus increasing the overall capacity of the article carrier apparatus.

The article carrier apparatus 100 further comprises a sensor 140 and a controller 150. The sensor 140 can be an automatic sorting device, for example as previously described. Such devices may incorporate cameras in order to monitor various aspects of each passing fruit article, for example size and color. In alternative embodiments a simpler sensor may simply monitor the percentage of cups holding a fruit article 160, or the number of fruit articles carried by each article carrier per unit time—this may be useful for example where the article carriers are continuous belts. The sensor 140 generates a capacity use parameter ($C_i$) for each lane. Where cup type article carriers are used, such a capacity use parameter is known as the cupfill of the lane as will be appreciated by those skilled in the art. The capacity use parameter (Ci) for each lane is then output to the controller 150 which uses this data to automatically control the position of each diverter 130. Thus for example some carrier lanes 120 having a high cupfill may have their adjacent diverters rotated inwardly to restrict the number of fruit 160 entering that lane, whereas other lanes may have their adjacent diverters rotated outwardly to increase the size of the input channel and hence of the number of fruit entering the lane in order to increase its cupfill.

Figure 2:
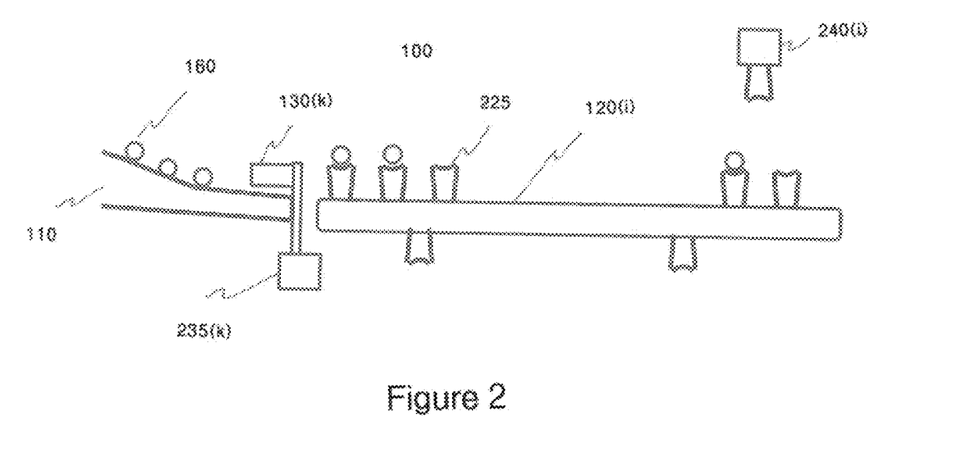
FIG. 2 shows a side view of an article carrier apparatus according to the embodiment of FIG. 1.

FIG. 2 shows a side view of the article carrier apparatus 100 of FIG. 1. A single carrier lane 120 (i) is shown which comprises a number of cups 225 for receiving the fruit articles 160. A camera 240 (i) forming part of the sensor 140 determines whether each cup carries an article 160. This information is used to determine the cupfill of the lane 120 (i) as could be appreciated by those skilled in the art. A diverter 130 (k) on one side of the lane 120 (i) is rotated by an actuator 235 (k) controlled by the controller 150. Similar actuators control the other diverters 130 (1-z). The controller 150 controls the individual diverters 130 according to a series of methods in order to more evenly distribute fruit articles across the carrier lanes.

Figure 3:
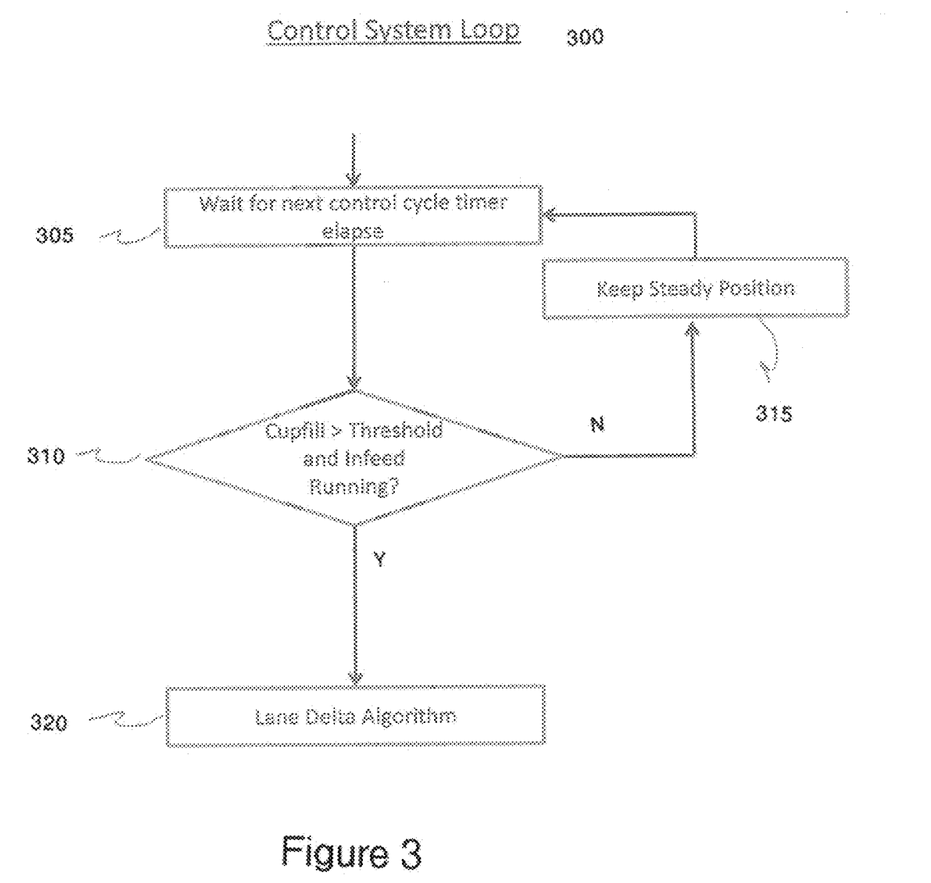
FIG. 3 is a flow chart of a control system loop method according to an embodiment.
Figure 4:
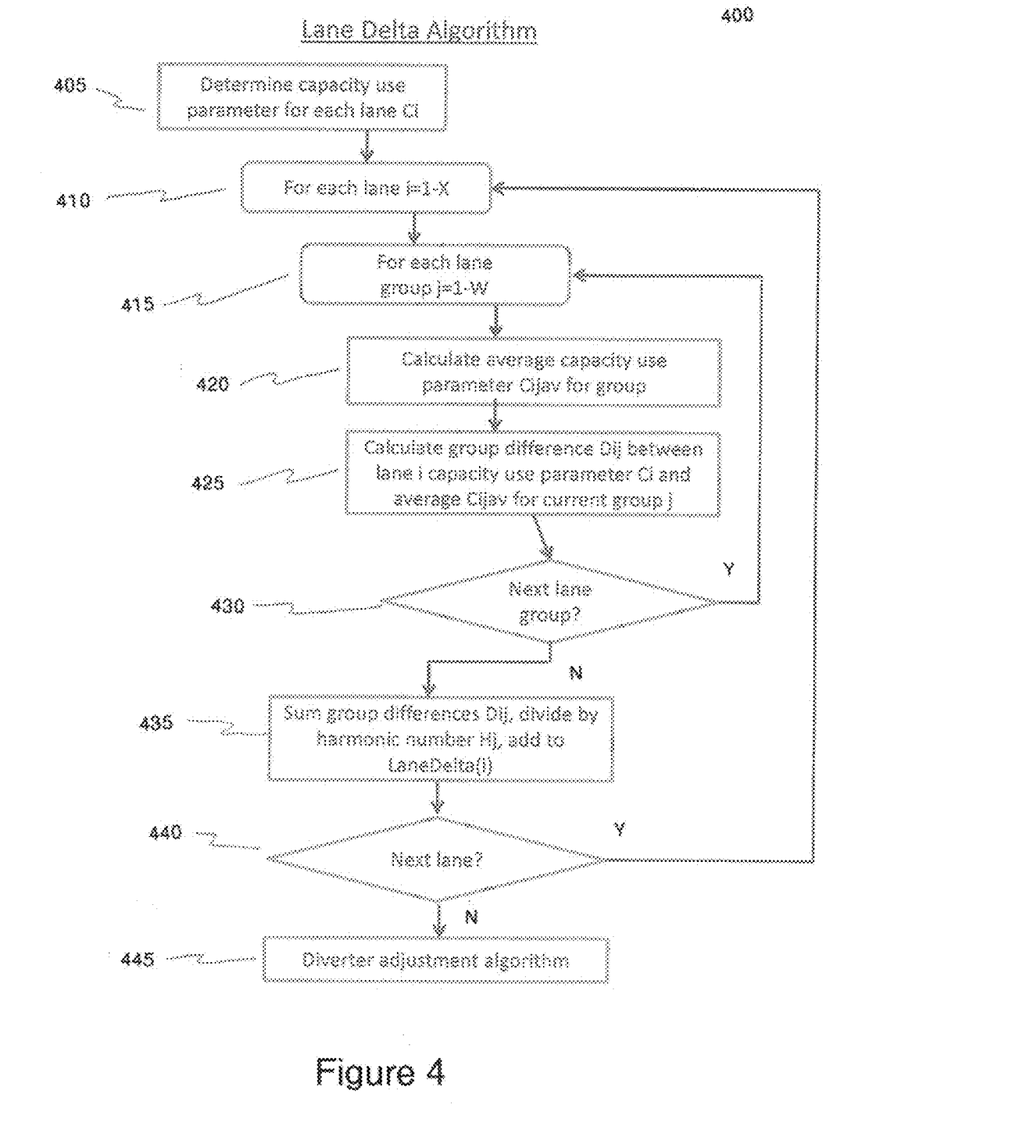
FIG. 4 is a flow chart of a lane delta method according to an embodiment.
Figure 5:
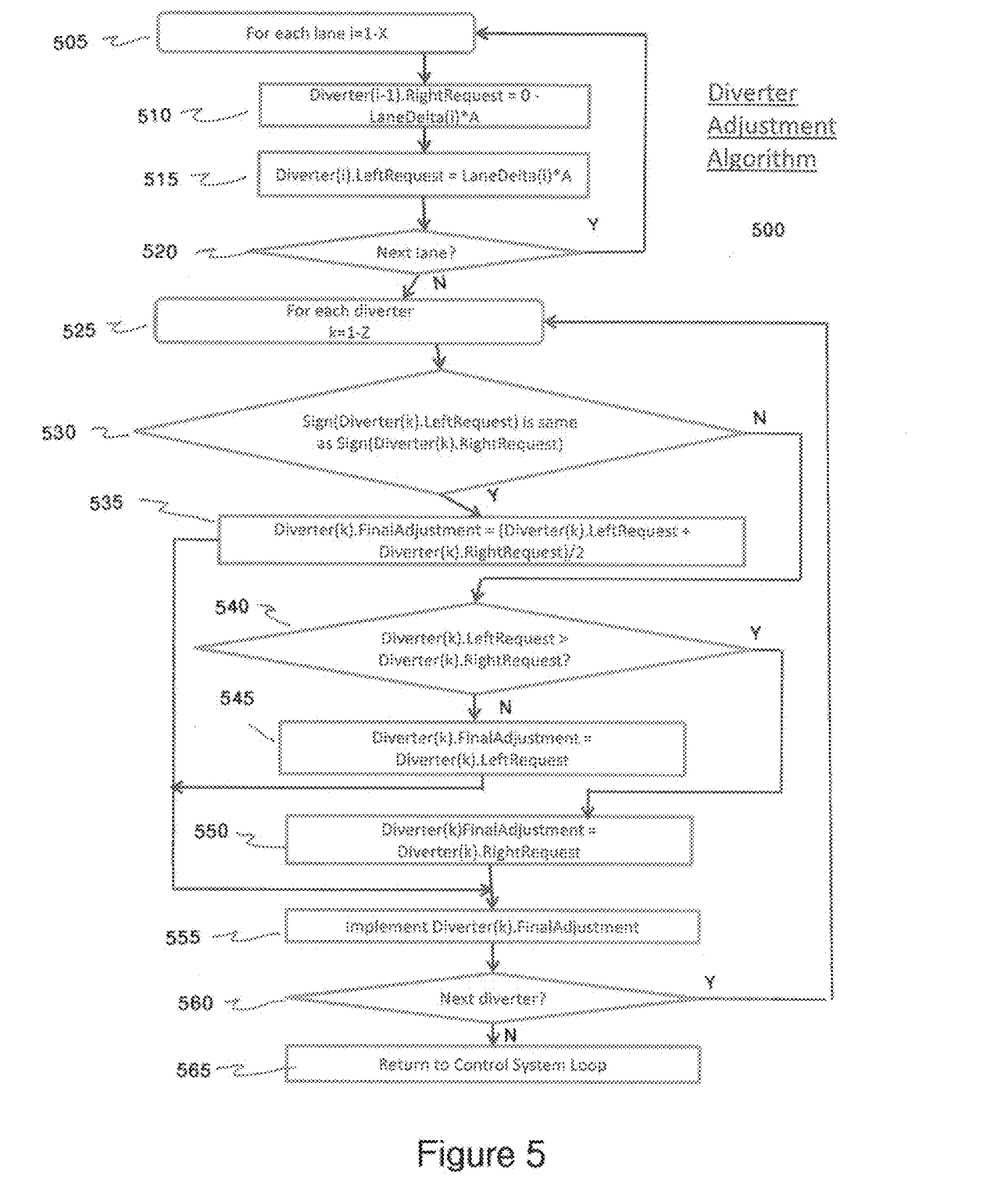
FIG. 5 is a flow chart of a diverter adjustment method according to an embodiment.

Methods according to embodiments are shown in FIGS. 3-5. Referring to FIG. 3, a flow chart for a control system loop method 300 is shown. At step 305, the control system loop method 300 waits for the next control cycle timer to elapse. A typical timer value is 30 seconds and provides that the dynamic fruit load of the article carrier apparatus is checked periodically. Once the current timer elapses, the method checks at step 310 whether the average cupfill of the parallel carrier lanes exceeds a threshold, and that the infeed is running. When the infeed is running, fruit or other articles are delivered to the infeed tray 110. If the average cupfill is below the threshold (for example 50%) or the infeed is not running, then the control system method maintains a steady position, indicated by step 315. In the steady position, the diverters remain in their previous positions, and the next timer is set before moving back to step 305. If at step 310, the average cupfill or other capacity use parameter (Ci) exceeds a threshold such as 50%, and the infeed is running (fruit is being fed on to the infeed tray 110), then the control system 150 moves to the lane delta method indicated by step 320. Such a state is indicative of high numbers of fruit being carried by the article carrier apparatus 100, and that it would benefit from even distribution of fruit across the lanes.

The lane delta method is shown in more detail in the flow chart of FIG. 4. The lane delta method 400 first determines a capacity use parameter (Ci) for each lane at step 405. In the embodiment of FIGS. 1 and 2, the capacity use parameter (Ci) is the cupfill which can be determined using the cameras of the sensor 140 (240). Then at step 410, the method 400 performs a number of steps to determine a lane adjustment parameter LaneDelta(j) for each of the carrier lanes (i=1–x). The LaneDelta for each lane corresponds to how much the input channel to the lane should increase or decrease in order to obtain a cupfill similar to those of adjacent lanes.

Figure 6:
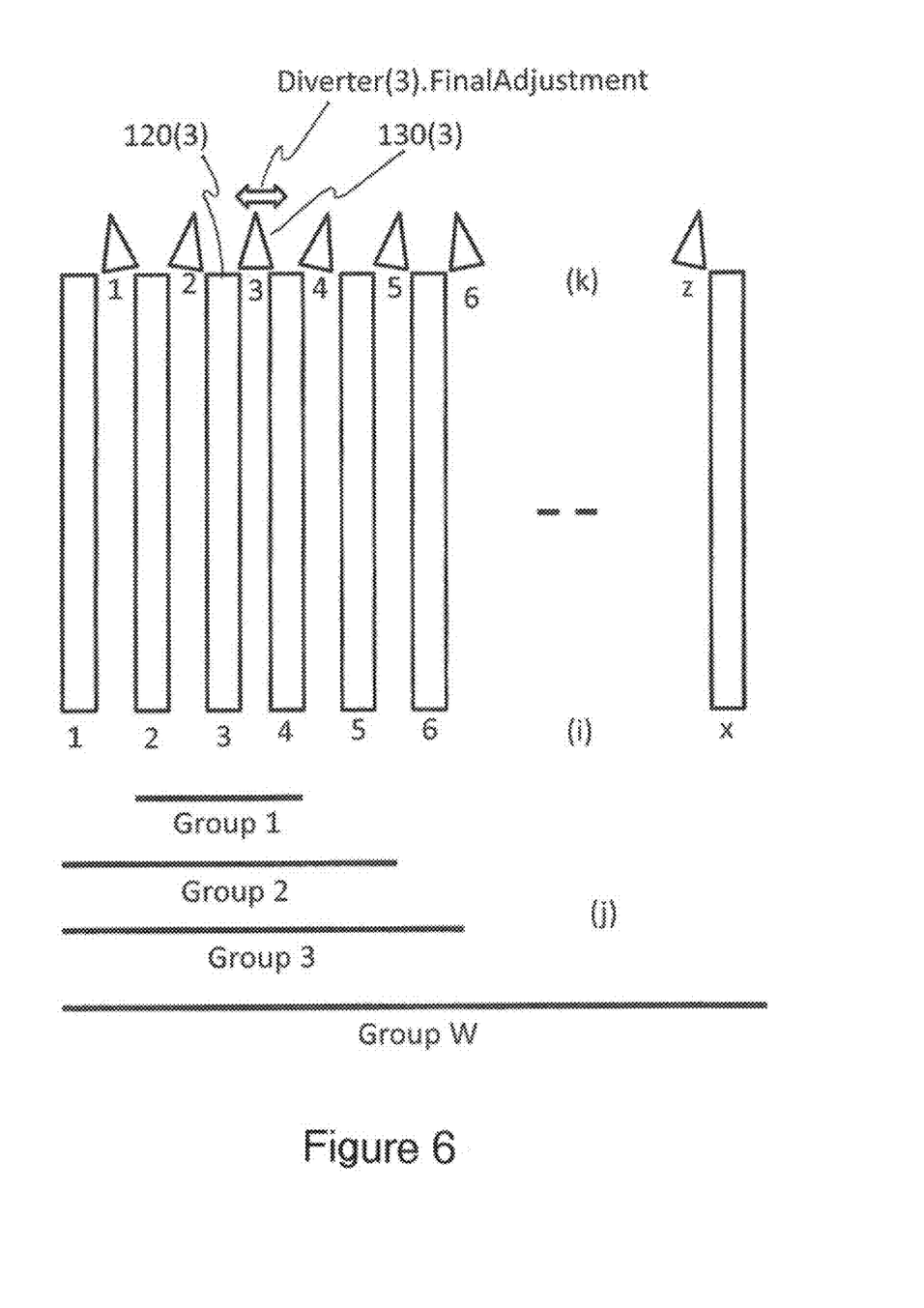
FIG. 6 is a schematic illustrating lane groups according to an embodiment.

In order to determine the LaneDelta(i) for each lane (i), groups (j) of adjacent lanes are analyzed for each lane (i) currently under consideration, as indicated by step 415. The allocation of lane groups (j) is illustrated schematically in FIG. 6. Taking as an example lane 120 (3) or i=3, a number of groups of adjacent lanes can be defined. Group 1 (j=1, and i=3) defines the smallest group of adjacent lanes comprising only the two immediately adjacent lanes 120 (2) and 120 (4). Larger group 2 (j=2 and i=3) includes two adjacent lanes on either side of the current lane of interest, the group comprising lanes 120 (1-5). The next largest group 3 (j=3 and i=3) extends to 3 adjacent lanes on each side where available. In this particular case because lane 1 is an outer lane only two adjacent lanes are available to the left of current lane i=3. Other lane groups may be defined up to a largest group W including all adjacent lanes. Although the groups have been defined as increasing one adjacent lane on each side, this is not necessary and other allocations of groups may alternatively be defined. Taking into account more and more distant adjacent lanes by grouping them as shown improves the stability and efficiency of the article distribution methods employed by the embodiments. Thus a method with more groups is typically more efficient at distributing fruit evenly across all of the carrier lanes and avoids "hunting" of the diverters.

Returning again to FIG. 4, for each of the defined lane groups j=1–w for each lane i=1–x, at step 420 the method calculates the average capacity use parameter (Cijav) for the current group. This parameter is simply the summation of for example the cupfill (Ci) for each of the lane carriers in the current group (j) divided by the number of lanes in the group. At step 425, the method 400 calculates a group difference parameter (Dij) between the capacity use parameter (Ci) of the current lane and the average (Cijav) for the current group (j). At step 430, the method determines whether there are further lane groups to process for the current lane, and if so returns to step 415. If all of the lane groups (j=1–w) for the current lane i have been completed, then the method 400 proceeds to step 435 where the group difference parameters (Dij) are summed. The sum of the group difference parameters is then divided by the jth harmonic number (Hj). The harmonic number is a known mathematical function which is the sum of the reciprocals of natural numbers up to the number j of lane groups employed. This results in a constant scaling factor where an increase in number of lanes has a lower influence. This value then becomes the lane adjustment parameter LaneDelta (i) for the current lane (i) under consideration. The LaneDelta (i) value of a lane is a parameter representing a desired adjustment in article capacity for the current lane; in order to more evenly distribute the articles across the apparatus 100. In an alternative embodiment, the LaneDelta(i) may be calculated by dividing each group difference parameter by the lane group number, i.e., LaneDelta(i)=Sum (Dij/j). This way the influence of lanes which are further away is reduced in a linear fashion with their distance—i.e., the further away lanes are (or the larger the lane group is) the less influence does it have when calculating the difference parameter.

At step 440, the method considers whether there are further lanes to process, and if so returns to step 410 where group processing of the next lane is carried out. If all lanes have been completed, the controller 150 moves on to a diverter adjustment method as indicated at step 445.

A diverter adjustment method according to an embodiment is shown in the flow chart of FIG. 5. The diverter adjustment method 500 receives adjustment requests for each diverter from the lane to its left and the lane to its right. In this embodiment the LaneDelta (i) values determined in the LaneDelta method of FIG. 4 are used, and correspond to lane adjustment parameters. These adjustment requests are compared in order to determine a final rotational adjustment for each diverter in order to best meet the requirements of each lane in the context of more evenly distributing fruit articles to all of the lanes of the article carrying apparatus.

The diverter adjustment method 500 according to the embodiment of FIG. 5 first determines adjustment requests for adjacent diverters of each lane starting at step 505. For each lane i=1−x, the method first determines a closing or right rotation adjustment for its associated left diverter according to:

$$\text{Diverter}(i-1).\text{RightRequest}=0-\text{LaneDelta}(i)*A.$$

A lower control value (Diverter(i−1).RightRequest) requests movement of the diverter to the left and a higher value requests movement of the diverter to the right. These correspond respectively to requesting the diverter to open and close the input channel to the lane or the gap between the diverters either side of the lane entrance. The LaneDelta has been determined from the previous lane delta method 400, and A is a constant which can be optimized by experiment or simulation. In an embodiment the control valve corresponds to a percentage of the maximum diverter rotational range. Where the LaneDelta(i) is positive, this will result in a negative control value for the Diverter(i−1) RightRequest control valve which corresponds to a request to move the diverter to the left. For the embodiment of FIG. 1, the diverter number to the left of the lane is one less than the lane number, hence the use of (i−1) in the equation. Thus for example when processing lane i=2, the diverter to the left is diverter 1 (i.e., i−1), and the diverter to the right is diverter 2 (i.e., i)

At step 515, a request to the diverter right of the current lane (i) is also determined:

$$\text{Diverter}(i).\text{LeftRequest}=\text{LaneDelta}(i)*A.$$

If the LaneDelta value is positive, then this corresponds to a request to the right hand diverter of the lane to move left. The effect of these two steps 510 and 515 is that if the lane adjustment parameter for the current lane (LaneDelta(i)) is negative, then the right request for the left diverter (Diverter (i−1).LeftRequest) is less than 0 (negative) thereby requesting the left diverter to move left. In addition the left request for the right diverter (Request(i).RightDiverter) is larger than 0 (positive) which will request the right diverter to move right. The combined result is a request for a larger input channel or gap between left and right diverters for the current lane in order to allow more fruit articles to be received, thereby increasing its capacity use parameter. If the LaneDelta is positive (greater than 0) then the right request for the left diverter is larger than 0 causing a request for the left diverter to move right and if the left request for the RightDiverter is less than 0 (negative) this causes a request for the right diverter to move left. The combined result is a request for a smaller gap between the two diverters of the current lane in order to reduce the amount of fruit articles being received and hence reduces its capacity use parameter.

For end lanes where there is no left or right diverter, these steps are ignored by the method as would be understood by those skilled in the art. At step 520 the method 500 determines whether there are further lanes to consider and if so returns to step 505 so that left and right diverter request values (Diverter(i−1).RightRequest and Diverter(i).LeftRequest) can be determined for the next lane. Note that many of the diverters will receive adjustment requests from two adjacent lanes, on the left and right of the diverter. If all lanes have been processed, the method 500 proceeds to step 525 so that the various requests for moving each diverter can be considered and a final adjustment value settled upon for implementing movement of each diverter.

For each diverter k=1−z, the method determines a Diverter(k).FinalAdjustment value which is dependent on the various adjustment request values from adjacent lanes and determined in the preceding steps. Each diverter (k) will have an adjustment request from the lane to its left (Diverter (k).RightRequest) and the lane to its right (Diverter(k) .LeftRequest). Different methods of combining these requests are used depending on whether the adjustment requests are in the same direction (e.g., rotate right) or opposite (e.g., one request to rotate left by a value and another request to rotate left by another value).

At step 530, for each diverter the method 500 determines whether the adjustment request values from each adjacent lane are for the same direction (i.e. whether the sign of the value for the left request and the right request from the adjacent lanes are the same).

If the requested adjustments are in the same direction (e.g. both left), the method moves to step 535 where a final adjustment value is arrived at which is the average of the two requests from the adjacent lanes:

$$\text{Diverter}(k).\text{FinalAdjustment}=(\text{Diverter}(k).\text{LeftRequest}+\text{Diverter}(k).\text{RightRequest})/2.$$

Using the average reduces hunting effects which might result from using one extreme adjustment request for example.

If however the signs are different, in other words one lane is requesting the diverter to move right and the other lane is requesting the diverter to move left, then the method moves to step 540 which determines which request value is larger. The method uses the larger of the two request values. Thus if Diverter(k).LeftRequest is greater than Diverter(k).RightRequest, then the method moves to step 550 where the Diverter(k).FinalAdjustment is allocated the Diverter (k).LeftRequest value. If this is not the case, then the Diverter(k).FinalAdjustment variable is assigned the Diverter (k).RightRequest value at step 545. In an alternative embodiment, the difference between the two adjustment requests could be used.

The method then moves to step 555 where the Diverter (k).Final Adjustment value assigned is implemented for the current diverter 130(k) using its respective actuator 235 (k). At step 560, the method 500 determines whether further diverters require processing and if so returns to step 525 for the next diverter. If all diverters have been completed, then the method moves to step 565 which represents a return to the control system loop method of FIG. 3.

Although the above methods have been described in order to implement automatic control of diverter positions dependant on the lane capacity use parameters, variations on the various parameters used, the assignment of values or the equations could alternatively be used. For example different diverter positions could be utilized which are not adjacent the carrier lanes, and may not be provided between the carrier lanes. Furthermore a different arrangement of carrier lane groups may be employed, including not using such groups at all. Different ways in which requests from left and right lanes may be combined to generate movement in a corresponding diverter could alternatively be used. In a further arrangement the diverter adjustment method 500 or the lane delta method 400 may be combined with a different lane delta or diverter adjustment method respectively.

Unless the context clearly requires otherwise, throughout the description and the claims, the words "comprise", "comprising", and like, are to be construed in an inclusive sense as opposed to an exclusive or exhaustive sense, that is to say, in the sense of "including, but not limited to".

Where in the foregoing description, reference has been made to specific components or integers of the invention having known equivalents, then such equivalents are herein incorporated as if individually set forth.

Although this invention has been described by way of example and with reference to possible embodiments thereof, it is to be understood that modifications or improvements may be made thereto without departing from the scope of the invention.

Any methods here disclosed or claimed may be implemented using a computer program product which when implemented on a computer causes the computer to execute the methods. Such a computer and/or computer program product may be implemented by any suitable processor and computer program, for example a general purpose processor and computer code instructions on a memory device CD ROM or the like or a downloaded file, a digital signal processor, ASIC or FPGA for example.

The embodiments of the invention in which an exclusive property or privilege is claimed are defined as follows:

1. An article carrying apparatus comprising:
   a plurality of carrier lanes each for receiving and conveying a number of articles, each of the plurality of carrier lanes having an input channel;
   at least one diverter arranged to control the distribution of received articles into the lanes, the at least one diverter being positioned at a receiving end of the carrier and between respective adjacent lanes;
   a sensor arranged to determine a capacity use parameter for each lane; and
   a controller arranged to control the position of each diverter dependent on the determined capacity use parameters, wherein each diverter is controlled to increase or decrease a size of an input channel of a carrier lane.

2. The apparatus according to claim 1, wherein the at least one diverter is individually rotatable.

3. The apparatus according to claim 1, wherein the controller is arranged to adjust the position of the at least one diverter adjacent at least one lane dependent on a difference in the capacity use parameter of the lane and the capacity use parameters of adjacent lanes.

4. The apparatus according to claim 1, wherein the controller is arranged to adjust the position of the at least one diverter adjacent the lane dependent on differences between the capacity use parameter of the lane and an average capacity use parameter derived from the capacity use parameters for each of a plurality of groups of adjacent lanes, each group of adjacent lanes comprising a different number of adjacent lanes.

5. The apparatus according to claim 4, wherein the controller is arranged to adjust the position of the at least one diverter adjacent a lane dependent on a lane adjustment parameter comprising the sum of the plurality of group differences between the capacity use parameter of the lane and the average capacity use parameters of each group of adjacent lanes, divided by the harmonic number of the total number of groups of adjacent lanes.

6. The apparatus according to claim 1, wherein the controller is arranged to adjust the positions of the diverters dependent on differences between the capacity use parameters of adjacent lanes.

7. The apparatus according to claim 6, wherein the controller is arranged to adjust the position of the at least one diverter using a plurality of differences between the capacity use parameter of each lane and an average capacity use parameter derived from the capacity use parameters for a plurality of groups of adjacent lanes, each group of adjacent lanes comprising a different number of adjacent lanes.

8. The apparatus according to claim 3, wherein the controller is arranged to adjust the position of the least one diverter using the lane adjustment parameter of adjacent lanes.

9. The apparatus according to claim 8, wherein the controller is arranged to adjust the position of the at least one diverter dependent on a final adjustment parameter derived from averaging the lane adjustment parameters of adjacent lanes when in the same direction or which is derived from the larger of the lane adjustment parameters when in opposite directions.

10. The apparatus according to claim 1, wherein each carrier lane comprises a plurality of cups each for receiving an item, and wherein the capacity use parameter is the cupfill of the respective carrier lane.

11. The apparatus according to claim 1, wherein the sensor comprises a camera arranged to view carried articles on each respective carrier lane.

12. The apparatus according to claim 1, further comprising an infeed tray located adjacent or arranged to incorporate the diverters.

13. A controller for an item carrying apparatus having a plurality of carrier lanes each for receiving and conveying a number of items, each of the plurality of carrier lanes having an input channel, at least one diverter arranged to control the distribution of received items into the lanes, the at least one diverter being positioned at a receiving end of the carrier and between respective adjacent lanes, and a sensor arranged to determine a capacity use parameter for each lane, the controller arranged to control the position of each diverter dependent on the determined capacity use parameters, wherein each diverter is controlled to increase or decrease a size of an input channel of a carrier lane.

14. The controller according to claim 13,
    wherein
    the controller is arranged to adjust the position of the at least one diverter adjacent at least one lane dependent on a difference in the capacity use parameter of the lane and the capacity use parameters of adjacent lanes.

15. The controller according to claim 14, wherein the controller is arranged to adjust the position of the at least one diverter adjacent at least one lane dependent on differences between the capacity use parameter of the lane and an average capacity use parameter derived from the capacity use parameters for each of a plurality of groups of adjacent lanes, each group of adjacent lanes comprising a different number of adjacent lanes.

16. The controller according to claim 15, wherein the controller is arranged to adjust the position of at least one diverter adjacent at least one lane dependent on a lane adjustment parameter comprising the sum of the plurality of group differences between the capacity use parameter of the lane and the average capacity use parameters of each group of adjacent lanes, divided by the harmonic number of the total number of groups of adjacent lanes.

17. A method of operating an item carrying apparatus comprising:
    receiving a number of items at a plurality of carrier lanes, each of the plurality of carrier lanes having an input channel;
    diverting the received items into the plurality of lanes using at least one diverter positioned at a receiving end of the carrier and between respective adjacent lanes;
    determining a capacity use parameter for each lane using a sensor; and
    automatically controlling the position of the at least one diverter dependent on the determined capacity use parameters, wherein each diverter is controlled to increase or decrease a size of an input channel of a carrier lane.

18. The method according to claim 17, wherein controlling the position of the diverter adjacent the lane comprises determining a difference in the capacity use parameter of the lane and the capacity use parameters of adjacent lanes.

19. The method according to claim 17, wherein controlling the position of at least one diverter adjacent a carrier lane comprises determining differences between the capacity use parameter of the lane and an average capacity use parameter derived from the capacity use parameters for each of a plurality of groups of adjacent lanes, each group of adjacent lanes comprising a different number of adjacent lanes.

20. The method according to claim 19, wherein controlling the position of at least one diverter adjacent a carrier lane comprises determining a lane adjustment parameter comprising the sum of the plurality of group differences between the capacity use parameter (i) of the lane and the average capacity use parameter of each group of adjacent lanes, divided by the harmonic number of the total number of groups of adjacent lanes.

21. The method according to claim 19, wherein controlling the position of at least one diverter adjacent a carrier lane comprises determining a final adjustment parameter which is derived from averaging the lane adjustment parameter of adjacent lanes when in the same direction or which is derived from the larger of the lane adjustment parameters when in opposite directions.

22. The method apparatus according to claim 19, wherein
each carrier lane comprises a plurality of cups each for receiving an item; and
the capacity use parameter is the cupfill of the respective carrier lane.

23. A system for grading fruit using an article carrier, comprising:
a plurality of carrier lanes each for receiving and conveying a number of articles, each of the plurality of carrier lanes having an input channel;
at least one diverter arranged to control the distribution of received articles into the lanes, the at least one diverter being positioned at a receiving end of the carrier and between respective adjacent lanes;
a sensor; and
a computing system configured to control the position of each diverter, wherein each diverter is controlled to increase or decrease a size of an input channel of a carrier lane, the computer system comprising:
a memory; and
a controller stored on the memory and that is configured, when executed, to:
determine a capacity use parameter for each lane; and
communicate a signal to the at least one diverter to alter the distribution of received articles into the lane as a function of at least one determined lane adjustment parameter.

24. The system according to claim 23, wherein the controller stored on the memory is configured, when executed, to determine a difference in the capacity use parameter of the lane and the capacity use parameters of adjacent lanes.

25. The system according to claim 23, wherein the controller stored on the memory is configured, when executed, to determine differences between the capacity use parameter of the lane and an average capacity use parameter derived from the capacity use parameters for each of a plurality of groups of adjacent lanes, each group of adjacent lanes comprising a different number of adjacent lanes.

26. The system according to claim 23, wherein the controller stored on the memory is configured, when executed, to determine a lane adjustment parameter comprising the sum of the plurality of group differences between the capacity use parameter (i) of the lane and the average capacity use parameter of each group of adjacent lanes, divided by the harmonic number of the total number of groups of adjacent lanes.

27. The system according to claim 23, wherein the controller stored on the memory is configured, when executed, to determine a final adjustment parameter which is derived from averaging the lane adjustment parameter of adjacent lanes when in the same direction or which is derived from the larger of the lane adjustment parameters when in opposite directions.

* * * * *